United States Patent [19]
Pellet et al.

[11] Patent Number: 4,686,029

[45] Date of Patent: Aug. 11, 1987

[54] DEWAXING CATALYSTS AND PROCESSES EMPLOYING TITANOALUMINOSILICATE MOLECULAR SIEVES

[75] Inventors: Regis J. Pellet, Croton-On-Hudson; Frank P. Gortsema, Pleasantville; Gary N. Long, Putnam Valley; Jule A. Rabo, Armonk, all of N.Y.

[73] Assignee: Union Carbide Corporation, Danbury, Conn.

[21] Appl. No.: 805,714

[22] Filed: Dec. 6, 1985

[51] Int. Cl.$^4$ .............................................. C10G 47/16
[52] U.S. Cl. ..................................... 208/111; 208/18; 208/27; 208/120; 208/121; 208/122; 208/110
[58] Field of Search ................ 208/111, 120, 18, 110, 208/121, 122, 27, 114

[56] References Cited

U.S. PATENT DOCUMENTS

| | | | |
|---|---|---|---|
| Re. 28,398 | 4/1975 | Chen et al. | 208/111 |
| 3,140,249 | 7/1964 | Plank et al. | 208/120 |
| 3,140,251 | 7/1964 | Plank et al. | 208/120 |
| 3,140,252 | 7/1964 | Frilette et al. | 208/120 |
| 3,140,253 | 7/1964 | Plank et al. | 208/120 |
| 3,700,585 | 10/1972 | Chen et al. | 208/111 |
| 3,852,189 | 12/1974 | Chen et al. | 208/120 |
| 3,956,102 | 5/1976 | Chen et al. | 208/111 |
| 3,968,024 | 7/1976 | Gorring et al. | 208/111 |
| 3,980,550 | 9/1976 | Gorring et al. | 208/111 |
| 4,153,540 | 5/1979 | Gorring et al. | 208/89 |
| 4,176,050 | 11/1979 | Chen et al. | 208/111 |
| 4,222,855 | 9/1980 | Pelrine et al. | 208/111 |
| 4,229,282 | 10/1980 | Peters et al. | 208/111 |
| 4,247,388 | 1/1981 | Banta et al. | 208/111 |
| 4,410,501 | 10/1983 | Taramasso et al. | 423/326 |
| 4,428,826 | 1/1984 | Walsh | 208/120 |
| 4,440,871 | 4/1984 | Lok et al. | 208/114 |
| 4,441,991 | 4/1984 | Dwyer et al. | 208/111 |
| 4,446,007 | 5/1984 | Smith | 208/111 |
| 4,551,236 | 11/1985 | Lok et al. | 208/143 |

FOREIGN PATENT DOCUMENTS 2078704  1/1982  United Kingdom ............... 423/326

OTHER PUBLICATIONS

Perego et al., "Titanium-Silicalite: a Novel Derivative in the Pentasil Family" in New Developments in Zeolite Science and Technology, Proceedings of the 7th International Zeolite Conference, Tokyo, Aug. 17–22, 1986 (Y. Murakami, A. Iijima, J. W. Ward, eds.), Elsevier, 1986.

*Primary Examiner*—Andrew H. Metz
*Assistant Examiner*—Anthony McFarlane
*Attorney, Agent, or Firm*—Vincent J. Vasta, Jr.

[57] ABSTRACT

Dewaxing processes for hydrocarbon feedstocks are disclosed using novel catalysts comprising titanoaluminosilicates. The products of the instant dewaxing processes are characterized by lower pour points than the hydrocarbon feedstock.

27 Claims, 6 Drawing Figures

4,686,029

DEWAXING CATALYSTS AND PROCESSES EMPLOYING TITANOALUMINOSILICATE MOLECULAR SIEVES

FIELD OF THE INVENTION

The present invention relates to dewaxing and hydrodewaxing catalysts comprising titanoaluminosilicate molecular sieves, as hereinafter described, and to processes employing such catalysts.

BACKGROUND OF THE INVENTION

Dewaxing and hydrodewaxing processes are employed in the refining industry to treat petroleum fractions having initial boiling points over about 350° F. to improve their pour point. The improvement in pour point is generally effected by selective removal of normal paraffins. Since the pour point of liquid hydrocarbon fuels, e.g., diesel fuels, shale oil, lube oils and other light gas oil fractions, are strictly controlled, the pour point specification of such fuels must be met if such are to be employed in their intended use.

The need to reduce the pour point of petroleum fractions has resulted in the development of numerous dewaxing and hydrodewaxing processes wherein the pour points of petroleum fractions are reduced by selective removal of paraffinic hydrocarbons. Processes relating to dewaxing and hydrodewaxing are well known in both the patent and scientific literature. Such processes have employed crystalline aluminosilicates as catalysts. For example, see U.S. Pat. Nos. 3,140,249; 3,140,252; 3,140,251; 3,140,253; 3,956,102; and 4,440,991. Further, ZSM type aluminosilicates have been disclosed for use in hydrocarbon conversion processes involving dewaxing. Representative patents include U.S. Pat. Nos.: Re. 28,398; 3,700,585; 3,852,189; 3,980,550, 3,968,024; 4,247,388; 4,153,540; 4,229,282; 4,176,050; 4,222,855; 4,428,826; 4,446,007. These and other patents disclose the use of various crystalline aluminosilicates as catalysts for dewaxing processes.

Although a large number of zeolitic materials have been disclosed as employable as catalysts for dewaxing and hydrodewaxing catalysts, the use of other microporous crystalline molecular sieves has not received significant attention. This lack of attention is attributable to the scarcity of molecular sieves other than crystalline aluminosilcates. One disclosure of a catalyst containing a crystalline silicate, as opposed to a crystalline aluminosilicate, is disclosed in U.S. Pat. No. 4,441,991.

The instant invention provides for catalytic dewaxing and hydrodewaxing of hydrocarbon feedstocks by contacting such with catalysts comprising titanoaluminosilicate molecular sieves, as hereinafter described.

SUMMARY OF THE INVENTION

Figure 1:
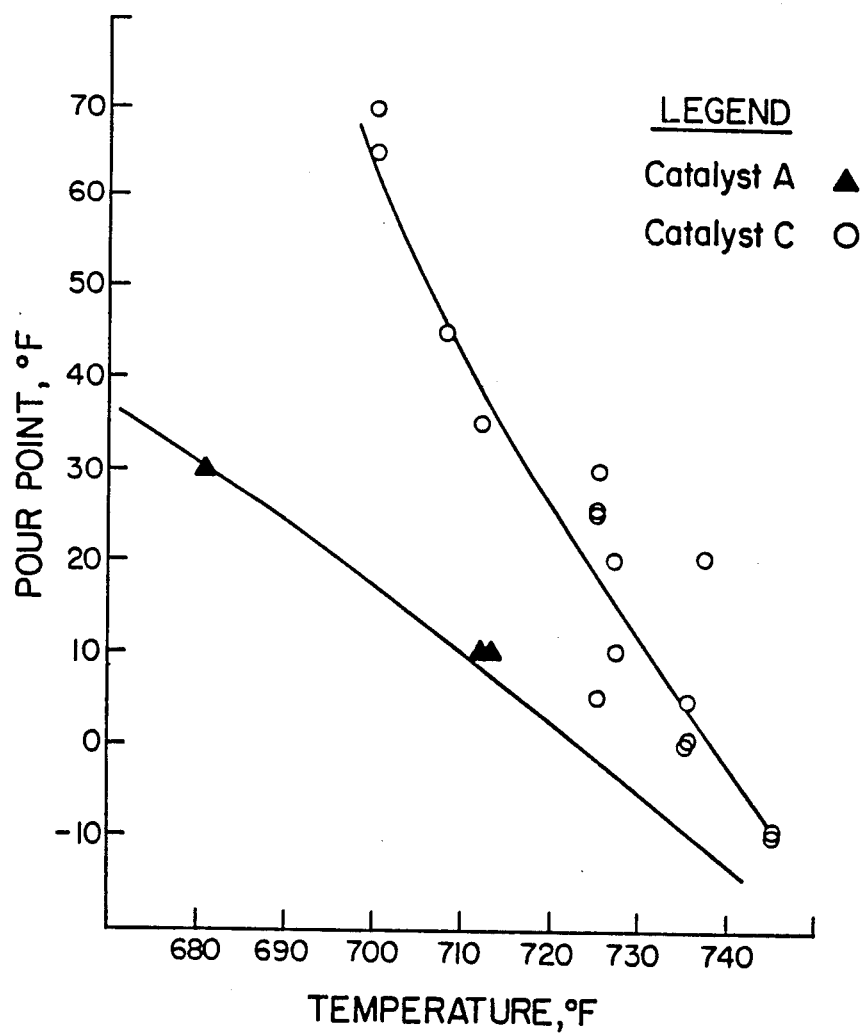
FIG. 1 is a plot of the pour point (°F.) as a function of process temperature for Catalyst A and Comparative Catalyst C.

The present invention relates to catalytic dewaxing and hydrodewaxing (hereinafter jointly referred to as "dewaxing") processes and catalysts employed in such processes. The catalysts of the instant invention comprise: (1) at least one titanoaluminosilicate molecular sieve, as hereinafter described, effective in the catalytic dewaxing of a hydrocarbon feedstock; and (2) in the instance of hydrodewaxing at least one hydrogenation component. The catalyst of this invention may also contain, as an optional component, a traditional cracking catalyst having catalytic activity for cracking and/or hydrocracking hydrocarbon feedstocks at effective dewaxing conditions. Traditional cracking catalysts may contain a zeolitic aluminosilicate(s) of the type generally employed heretofore in cracking and/or hydrocracking catalysts. The titanoaluminosilicate (denominated herein as "TASO") molecular sieves employed in the preparation of the catalysts employed in the instant invention, i.e., catalysts and processes, are disclosed in copending and commonly assigned U.S. Pat. Ser. Nos. 604,179, 604,236 and 604,155, said applications filed on Apr. 26, 1984, incorporated herein by reference thereto. The TASO's employed herein are characterized in their calcined form by an adsorption of isobutane of at least 2 percent by weight, desirably at least 4 percent by weight, at a partial pressure of 500 torr and a temperature of 20° C. and are also characterized by an adsorption of triethylamine of less than 5 percent by weight, desirably less than 3 percent by weight, at a partial pressure of 2.6 torr and a temperature of 22° C. The preferred titanoaluminosilicate is TASO- 45, as discussed hereinafter. The traditional dewaxing catalyst component, e.g., a zeolitic aluminosilicate, if any, is characterized as being a dewaxing catalyst component, such as heretofore traditionally employed in dewaxing processes, e.g., the various forms of zeolite Y, silica alumina, and hydrogenation components. The titanoaluminosilicate molecular sieves employed in this invention are unique in that such are not simple aluminosilicates, as heretofore employed in the prior art, but are novel molecular sieves having unique performance when employed as components of dewaxing catalysts.

DETAILED DESCRIPTION OF THE INVENTION

Dewaxing and hydrodewaxing processes involve converting high boiling and high pour point paraffinic hydrocarbon feedstocks to lower boiling and lower pour point hydrocarbon products. Further, hydrodewaxing involves hydrogenating unsaturates in the hydrocarbon product and removal of organic sulfur and nitrogen containing compounds. The term "dewaxing" is employed herein to generally refer to processes for the removal of hydrocarbons which readily solidify from petroleum stocks as waxes. The term "dewaxing" is employed herein to include catalytic dewaxing and hydrodewaxing. Dewaxing processes may also involve the removal of organic sulfur and nitrogen compounds to form hydrogen sulfide and ammonia.

The catalysts of the instant invention are believed to selectively convert normal paraffins to non-normal products and, accordingly, reduce the pour point of such products. This reduction in the pour point by selective normal paraffin conversion is of commercial significance, since distillate products, e.g. lubricating oils, have rigid specifications on the acceptable pour point.

The titanoaluminosilicate molecular sieves are characterized in their calcined form by an adsorption of isobutane of at least 2 percent by weight, desirably by at least 4 percent by weight, at a partial pressure of 500 torr and a temperature of 20° C. and are also characterized in their calcined form by an adsorption of triethylamine to less than 5 percent by weight adsorption of triethylamine, desirably less than 3 percent by weight, at a partial pressure of 2.6 torr and a temperature of 22° C.

TITANOALUMINOSILICATE MOLECULAR SIEVES

The titanium aluminum silicon oxides, i.e., titanoaluminosilicates, will be generally referred to herein by the acronym "TASO" to designate titanium aluminum silicon oxide molecular sieves having a framework structure of $TiO_2$, $AlO_2$ and $SiO_2$ tetrahedral oxide units. The individual class members or species of copending U.S. Pat. Ser. Nos. 604,155 and 604,236 will be identified herein by denominating the various structural species which make up these TASO classes by assigning a number to the species, whereby such are identified as "TASO-i" where the number "i" is an integer. This designation is an arbitrary one and is not intended to denote structural relations to another material(s) which may also be characterized by a numbering system. The titanoaluminosilicates of copending U.S. Pat. Ser. No. 604,179 are generally referred to herein as "TASOs", although such are designated herein and in said copending application as "LZ-n" where "n" is an integer. This designation is an arbitrary one and is not intended to denote structural relations to another material(s) which may also be characterized by a numbering system. The following is a description of the TASOs disclosed in the aforementioned copending applications:

TASOs (I) The titanoaluminosilicate molecular sieves of copending U.S. Pat. Ser. Nos. 604,155 and 604,236 are characterized as having three-dimensional microporous crystal framework structures of $TiO_2$, $AlO_2$ and $SiO_2$ tetrahedral units which have a unit empirical formula on an anhydrous basis of:

$$mR:(Ti_xAl_ySi_z)O_2 \qquad (1)$$

wherein "R" represents at least one organic templating agent present in the intracrystalline pore system; "m" represents the moles of "R" present per mole of $(Ti_xAl_ySi_z)O_2$ and has a value of between zero and about 0.3, the maximum value in each case depending upon the molecular dimensions of the templating agent and the available void volume of pore system of the particular TASO molecular sieve; and "x", "y" and "z" represent the mole fractions of titanium, aluminum and silicon respectively present as tetrahedral oxides, said mole fractions being such that they are within the tetragonal compositional area defined by points A, B, C and D of FIG. 3. When said molecular sieves are characterized by the X ray patterns of Tables I, II or III, as hereinafter defined. A, B, C, D, E and F are represented by the following values for "x", "y" and "z":

| Point | Mole Fraction | | |
|---|---|---|---|
| | x | y | z |
| A | 0.39 | 0.60 | 0.01 |
| B | 0.98 | 0.01 | 0.01 |
| C | 0.01 | 0.01 | 0.98 |
| D | 0.01 | 0.60 | 0.39 |
| E | 0.01 | 0.49 | 0.50 |
| F | 0.49 | 0.01 | 0.50 |

Figure 4:
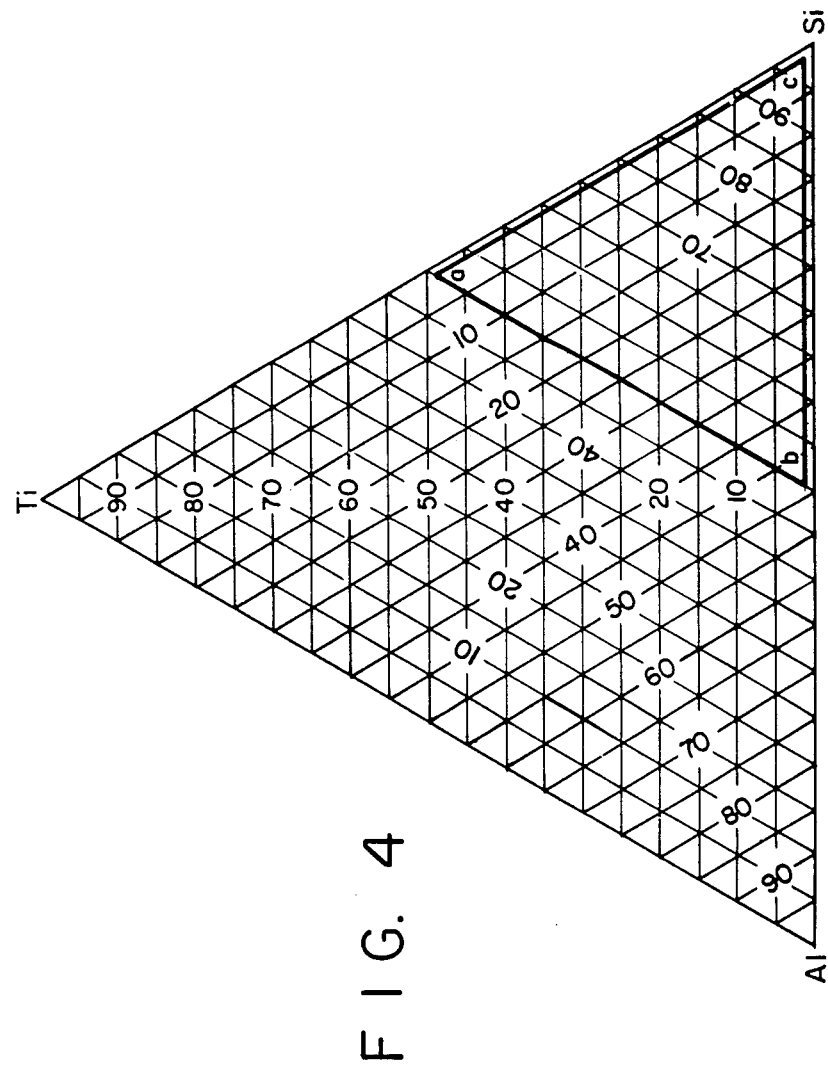
FIG. 4 is a ternary diagram wherein parameters relating to preferred titanoaluminosilicates are set forth as mole fractions.

Alternatively, "x", "y" and "z" represent mole fractions of titanium, aluminum and silicon, respectively as framework tetrahedral oxide units; said mole fractions being such that they are within the area defined by points a, b, and c of FIG. 4, where points a, b, and c have the following values for "x", "y" and "z":

| Point | Mole Fraction | | |
|---|---|---|---|
| | x | y | z |
| a | 0.49 | 0.01 | 0.50 |
| b | 0.01 | 0.49 | 0.59 |
| c | 0.01 | 0.01 | 0.98 |

Figure 3:
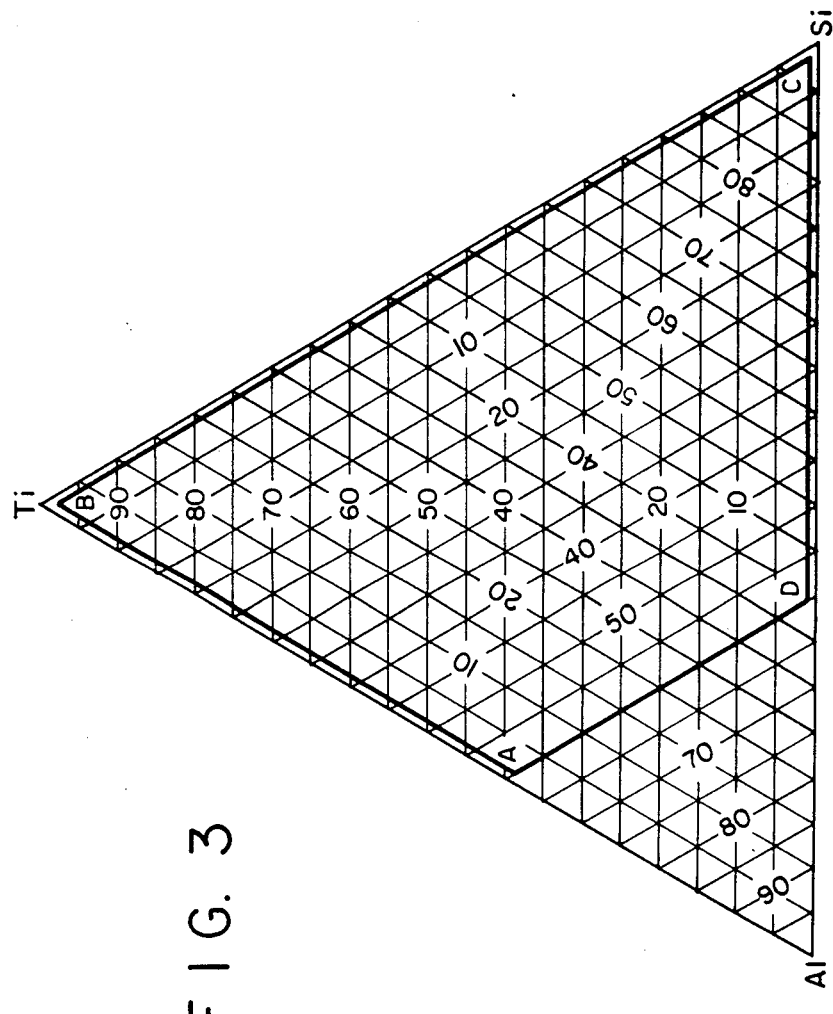
FIG. 3 is a ternary diagram wherein parameters relating to the instant titanoaluminosilicates are set forth as mole fractions.

In a further embodiment the values of "x", "y" and "z" are preferably within the compositional area defined by points A, B, D, E and F of the ternary diagram which is FIG. 3 of the drawings said points A, B, D, E and F representing the following values for "x", "y" and "z":

| Point | Mole Fraction | | |
|---|---|---|---|
| | x | y | z |
| A | 0.39 | 0.60 | 0.01 |
| B | 0.98 | 0.01 | 0.01 |
| D | 0.01 | 0.60 | 0.39 |
| E | 0.01 | 0.49 | 0.50 |
| F | 0.49 | 0.01 | 0.50 |

The term "unit empirical formula" is used herein according to its common meaning to designate the simplest formula which gives the relative number of moles of titanium, aluminum and silicon which form the $TiO_2$, $AlO_2$ and $SiO_2$ and $SiO_2$ tetrahedral unit within a titanium aluminum silicon oxide molecular sieve and which form the molecular framework of the TASO composition(s). The unit empirical formula is given in terms of titanium, aluminum and silicon as shown in Formula (1), above, and does not include other compounds, cations or anions which may be present as a result of the preparation or the existence of other impurities or materials in the bulk composition not containing the aforementioned tetrahedral units. The amount of template "R" is reported as part of the composition when the as synthesized unit empirical formula is given and water may also be reported unless such is defined as the anhydrous form. For convenience, coefficient "m" for template "R" is reported as a value that is normalized by dividing the number of moles of organic by the total moles of titanium, aluminum and silicon.

The unit empirical formula for a given TASO can be calculated using the chemical analysis data for that TASO. Thus, for example, in the preparation of TASOs the overall composition of the as-synthesized TAS is calculated using the chemical analysis data and expressed in terms of molar oxide ratios on an anhydrous basis.

The unit empirical formula for a TASO may be given on an "as synthesized" basis or may be given after an "as synthesized" TASO composition has been subjected to some post treatment process, e.g., calcination. The term "as synthesized" herein shall be used to refer to a TASO composition(s) formed as a result of the hydrothermal crystallization but before the TASO composition has been subjected to post treatment to remove any volatile components present therein. The actual value of "m" for a post treated TASO will depend on several factors, including: the particular TASO template, severity of the post treatment in terms of its ability to remove the template from the TASO, the proposed application of the TASO composition, etc. The value for "m" can be within the range of values as defined for the as-synthesized TASO compositions, although such is generally less than the as-synthesized TASO unless such post treatment process adds template to the TASO so treated. A TASO composition which is in the calcined or other post treatment form generally has an empirical formula represented by Formula (1), except that the value of "m" is generally less than about 0.02. Under sufficiently severe post-treatment conditions e.g., roasting in air at high temperature for long periods (over 1 hr.) the value of "m" may be zero (0) or, in any event, the template, R, is undetectable by normal analytical procedures.

The molecular sieves of the instant invention are generally synthesized by hydrothermal crystallization from a reaction mixture comprising reactive sources of titanium, aluminum and silicon and preferably one or more organic templating agents. Optionally alkali metal(s) may be present in the reaction mixture. The reaction mixture is placed in a pressure vessel, preferably lined with an inert plastic material, such as polytetrafluoroethylene, and heated, preferably under autogenous pressure, at a temperature of from about 50° C. to about 250° C. until crystals of the molecular sieve product are obtained, usually for a period of from 2 hours to 2 weeks or more. While not essential to the synthesis of the instant molecular sieves it has been found that in general stirring or other moderate agitation of the reaction mixture and/or seeding the reaction mixture with seed crystals of either the TASO to be produced, or a topologically similar composition facilitates the crystallization procedure. The product is recovered by any convenient method such as centrifugation or filtration.

After crystallization the TASO may be isolated and washed with water and dried in air. As a result of the hydrothermal crystallization, the as-synthesized TASO contains within its intracrystalline pore system at least one form of any template employed in its formation. Generally, the template is a molecular species but it is possible, steric considerations permitting, that at least some of the template is present as a charge balancing cation. Generally the template is too large to move freely through the intracrystalline pore system of the formed TASO and may be removed by a post treatment process such as by calcining the TASO at temperatures of between about 200° C. and about 700° C. so as to thermally degrade the template or by employing some other post treatment process for removal of at least part of the template from the TASO. In some instances the pores of the TASO are sufficiently large to permit transport of the template and, accordingly, complete or partial removal thereof can be accomplished by conventional desorption procedures such as carried out in the case of zeolites.

Figure 5:
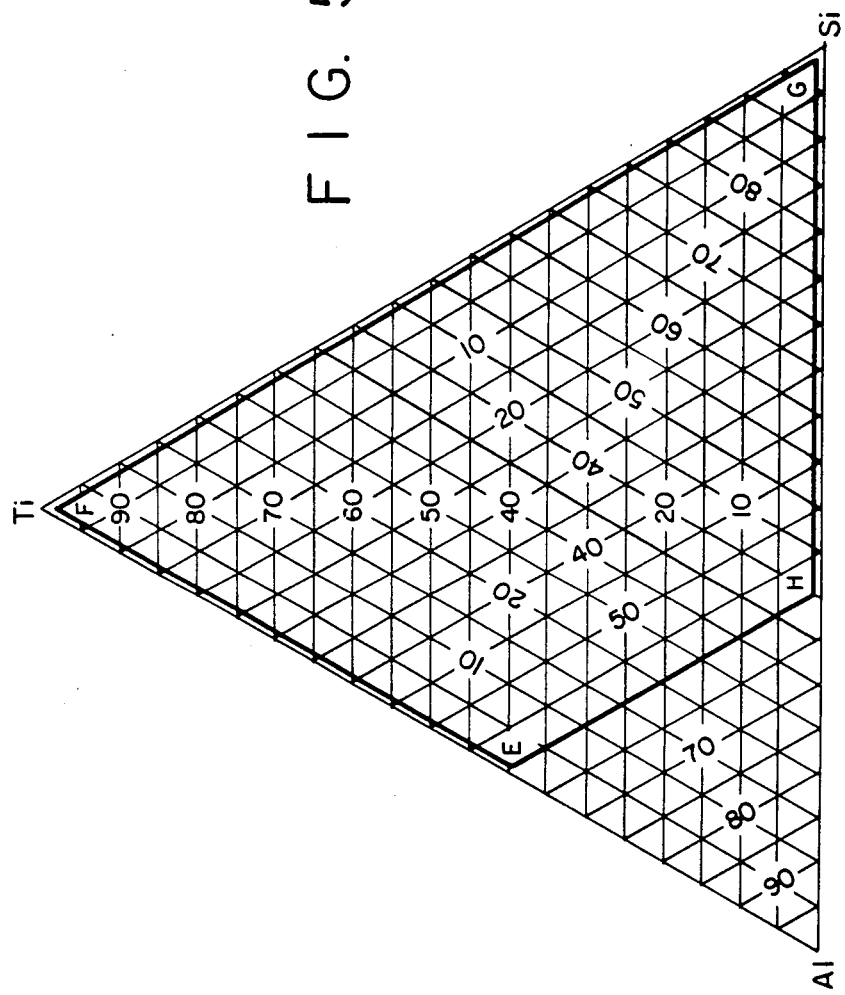
FIG. 5 is a ternary diagram wherein parameters relating to the reaction mixtures employed in the preparation of the instant titanoaluminosilicates are set forth as mole fractions.

The TASO compositions are generally formed from a reaction mixture containing reactive sources of $TiO_2$, $Al_2O_3$, and $SiO_Z$ and an organic templating agent. The reaction mixture may comprise a composition expressed in terms of molar oxide ratios of:

$$aR_2O:(Ti_xAl_ySi_z)O_2:b\ H_2O$$

wherein "R" is an organic templating agent; "a" has a value large enough to constitute an effective amount of "R", said effective amount being that amount which forms said TASO compositions and preferably being from greater than zero to about 50, preferably between about 1 and about 25; "b" is an effective amount of water and has a value of from zero to about 400, preferably from about 50 to about 100; and "x", "y" and "z" represent the mole fractions respectively of titanium, aluminum and silicon in the $(Ti_xAl_ySi_z)O_2$ constituents and each has a value of at least 0.01 and are preferably within the tetragonal compositional area defined by points, E, F, G and H which is FIG. 5 of the drawings, where points E, F, G and H represent the following values for "x", "y" and "z":

| Point | Mole Fraction | | |
|---|---|---|---|
| | x | y | z |
| E | 0.39 | 0.60 | 0.01 |
| F | 0.98 | 0.01 | 0.01 |
| G | 0.01 | 0.01 | 0.98 |
| H | 0.01 | 0.60 | 0.39 |

The reaction mixture from which these TASOs are formed generally contain one or more organic templating agents (templates) which can be almost any of those heretofore proposed for use in the synthesis of aluminosilicates and aluminophosphates. The template preferably contains at least one element of Group VA of the Periodic Table, particularly nitrogen, phosphorus, arsenic and/or antimony, more preferably nitrogen or phosphorus. The organic templating agents generally contain nitrogen or phosphorus and are of the formula $R'_4X$, wherein X is selected from the group consisting of nitrogen, phosphorus, arsenic and/or antimony and R' may be hydrogen, alkyl, aryl, arylalkyl, or alkylaryl containing aryl or alkyl groups containing between 1 and 8 carbon atoms, although more than eight carbon atoms may be present in the "R'" group of the template. Nitrogen containing templates are the most preferred and generally include amines and guaternary ammonium compounds, the latter being represented generally by the formula $R'_4N^+$ wherein each R' is an alkyl, aryl, alkylaryl or araalkyl group, wherein R' preferably contains from 1 to 8 carbon atoms, as hereinbefore discussed. Polymeric quaternary ammonium salts such as $[(C_{14}H_{32}N_2)\ (OH)_2]_x$ wherein "x" has a value of at least 2 may also be employed. The mono-, di- and tri-amines, including mixed amines may also be employed as templates either alone or in combination with a quaternary ammonium compound, quaternary phosphonium compound or another template. The exact relationship of various templates when concurrently employed is not clearly understood. Mixtures of two or more templating agents can produce either mixtures of TASOs or in the instance where one template is more strongly directing than another template the more strongly directing template may control the course of the hydrothermal crystallization with the other template serving primarily to establish the pH conditions of the reaction mixture.

Representative templates which may be employed herein include: tetramethylammonium ions; tetraethylammonium ions; tetrapropylammonium ions; tetrabutylammonium ions; di-n propylamine; tripropylamine; triethylamine; triethanolamine; piperidine; cyclohexylamine; 2 methylpyridine; N,N-dimethylbenzylamine; N,N diethylethanolamine; dicyclohexylamine; N,N dimethylethanolamine; 1,4-diazabicyclo (2,2,2) octane; N-methyldiethanolamine N-methylethanolamine; N-methylcyclohexylamine; 3-methylpyridine; 4-methylpyridine; quinuclidine; N,N'-dimethyl-1,4-diazabicyclo (2,2,2) octane ion; di-n-butylamine, neopentylamine; di-n-pentylamine; isopropylamine; t-butylamine; ethylenediamine; pyrolidine; and 2-imidazolidone.

In those instances where an alkoxide is the reactive source of titanium, aluminum and/or silicon the corresponding alcohol is necessarily present in the reaction mixture since it is a hydrolysis product of the alkoxide. It has not as yet been determined whether this alcohol participates in the synthesis process as a templating agent, or in some other function and, accordingly, is not reported as a template in the unit formula of the TASOs, although such may be acting as templates.

Alkali metal cations when present in the reaction mixture may facilitate the crystallization of certain TASO phases although the exact function of such cations in crystallization, if any, is not presently known. Alkali cations present in the reaction mixture generally appear in the formed TASO compositions either as occluded (extraneous) cations and/or as structural cations balancing net negative charges at various sites in the crystal lattice. It should be understood that although the unit formula for the TASOs does not specifically recite the presence of alkali cations they are not excluded in the same sense that hydrogen cations and/or hydroxyl groups are not specifically provided for in the traditional formulae for zeolitic aluminosilicates.

Almost any reactive titanium source may by employed herein. The preferred reactive titanium sources include titanium alkoxides, water-soluble titanates, titanate esters and titanium chelates.

Almost any reactive source of silicon can be employed herein. The preferred reactive sources of silicon are silica, either as a silica sol or as fumed silica, a reactive solid amorphous precipitated silica, silica gel, alkoxides of silicon, silicic acid or alkali metal silicate and mixtures thereof.

Almost any reactive aluminum source may be employed herein. The preferred reactive aluminum sources include sodium aluminates, aluminum alkoxides such as aluminum isopropoxides, and pseudoboehmite. Crystalline or amorphous aluminosilicates which are a suitable source of silicon may also be suitable sources of aluminum. Other sources of aluminum used in zeolite synthesis such as gibbsite and aluminum trichloride may be employed but are generally not deemed preferred.

The X-ray patterns set forth herein and all other X-ray patterns appearing herein were obtained using either: (1) standard x ray powder diffraction techniques; or (2) by using copper K alpha radiation with computer based techniques using Siemens D-500 X-ray powder diffractometers, (Siemens Type K-805 X-ray sources, available from Siemens Corporation, Cherry Hill, New Jersey) with appropriate computer interface. When employing the standard X ray technique the radiation source is a high intensity, copper target, X-ray tube operated at 50 Kv and 40 ma. The diffraction pattern from the copper K-alpha radiation and graphite monochromator is suitably recorded by an X-ray spectrometer scintillation counter pulse height analyzer and strip chart recorder. Flat compressed powder samples are scanned at 2° (2 theta) per minute using a two second time constant. Interplanar spacings (d) in Angstrom units are obtained from the position of the diffraction peaks expressed as $2\theta$ (theta) where theta is the Bragg angle as observed on the strip chart. Intensities are determined from the heights of diffraction peaks after subtracting background. "$I_o$" being the intensity of the strongest line or peak and "I" being the intensity of each of the other peaks. When Relative Intensities are reported herein the following abbreviations mean: vs=very strong; s=strong; m=medium; w=weak; and vw=very weak.

Other abbreviations include: sh=shoulder and br=broad.

As will be understood by those skilled in the art the determination of the parameter 2 theta is subject to both human and mechanical error, which in combination can impose an uncertainty of about ±0.4° on each reported value of 2 theta. This uncertainty is of course also manifested in the reported values of the d-spacings which are calculated from the 2 theta values. This imprecision is general throughout the art and is not sufficient to preclude the differentiation of the present crystalline materials from each other and from the compositions of the prior art.

TASO compositions employable in the instant dewaxing processes and disclosed in copending U.S. Pat. Ser. Nos. 604,236 and 604,155, aforementioned, include those having characteristic x-ray powder diffraction patterns as set forth in one of Tables I, II or III below:

TABLE I

| $2\theta$ | d, (Å) | Relative Intensity |
|---|---|---|
| (TASO-48) | | |
| 7.8–8.0 | 11.3–11.05 | m-vs |
| 8.7–8.9 | 10.16–9.94 | m |
| 22.9–23.2 | 3.88–3.83 | m-vs |
| 23.7–24.0 | 3.75–3.71 | m |
| 24.2–24.4 | 3.68–3.65 | w-m |

TABLE II

| $2\theta$ | d, (Å) | Relative Intensity |
|---|---|---|
| (TASO-49) | | |
| 7.3–7.4 | 12.11–11.95 | m-s |
| 7.5–7.6 | 11.79–11.63 | m |
| 20.6–20.8 | 4.31–4.27 | s-vs |
| 22.2–22.3 | 4.00–3.99 | m |
| 23.0–23.1 | 3.87–3.85 | s-vs |

TABLE III

| $2\theta$ | d, (Å) | Relative Intensity |
|---|---|---|
| (TASO-45) | | |
| 7.9–8.0 | 11.17–11.10 | m-vs |

TABLE III-continued

| | (TASO-45) | |
|---|---|---|
| $2\theta$ | d, (Å) | Relative Intensity |
| 8.8–8.9 | 10.03–9.97 | m |
| 23.1–23.3 | 3.85–3.82 | m-vs |
| 23.7–23.8 | 3.76–3.75 | m |
| 23.9–24.0 | 3.73–3.71 | m |
| 24.4–24.5 | 3.56–3.63 | m |

(II) Titanium-containing molecular sieves disclosed in copending U.S. Serial No. 604,179 are prepared by contacting a crystalline zeolite having pore diameters of at least about 3 Angstroms and having a molar $SiO_2/Al_2O_3$ ratio of at least 3, with an effective amount of fluoro salt of titanium, preferably in an amount of at least 0.001 moles per 100 grams of zeolite starting material, said fluoro salt being in the form of an aqueous solution or slurry and brought into contact with the zeolite either incrementally or continously at a slow rate (optionally in the presence of a buffer) whereby framework aluminum atoms of the zeolite are removed and replaced by titanium atoms. It is desirable that the process be carried out such that at least 60, preferably at least 80, and more preferably at least 90 percent of the crystal structure of the starting zeolite is retained and that the Defect Structure Factor (hereinafter defined) is increased by less than 0.15, and preferably by less than 0.10.

Crystalline zeolite starting materials suitable for preparing the titanium substituted zeolites can be any of the well known naturally occurring or synthetically produced zeolite species which have pores large enough to permit the passage of water, titanium fluoro salts and reaction products through their internal cavity system. These zeolite starting materials can be represented, in terms of molar ratios of oxides, as $$M_{2/n}O:Al_2O_3:x\ SiO_2:y\ H_2O$$

wherein "M" is a cation having the valence "n", "x" is a value of at least about 3 and "y" has a value of from zero to about 9 depending upon the degree of hydration and the capacity of the particular zeolite to hold absorbed water. Alternatively, the framework composition of the naturally occurring or synthetic zeolite starting material can be expressed in terms of the mole fraction of framework tetrahedra, $TO_2$, as:

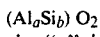

$$(Al_aSi_b)\ O_2$$

wherein "a" is the fraction of framework tetrahedral sites occupied by aluminum atoms and "b" is the fraction of framework tetrahedral sites occupied by silicon atoms. Should the framework of the starting material contain atoms in addition to silicon and aluminum, these materials may be similarly expressed in terms of their "$TO_2$" formula in terms of their fractional occupation of the framework of the starting material. The algebraic sum of all of the subscripts within the brackets is equal to 1. In the above example, a+b=1.

Representative of the crystalline aluminosilicate zeolite molecular sieves which may be employed include, but are not limited to omega, beta, mordenite, zeolite Y, ZSM-5, zeolite L and zeolite LZ-105. Both naturally occurring and synthetically prepared zeolite molecular sieves can be used. Zeolite Y is disclosed in U.S. Pat. No. 3,130,007; zeolite L is disclosed in U.S. Pat. No. 3,216,789; zeolite LZ-105 is disclosed in U.S. Pat. No. 4,257,885; zeolite omega is disclosed in U.S. Pat. No. 4,241,036; zeolite beta is disclosed in U.S. Pat. No. 3,308,069; and zeolite ZSM-5 is disclosed in U.S. Pat. No. 3,702,886.

The starting zeolite should be able to withstand the initial loss of framework aluminum atoms to at least a modest degree without collapse of the crystal structure unless the process is to be carried out at a very slow rate. In general the ability to withstand aluminum extraction and maintain a high level of crystallinity is directly proportional to the initial $SiO_2/Al_2O_3$ molar ratio of the zeolite. Accordingly, it is preferred that the value for "x" in the formula above, be at least about 3. Also it is preferred that at least about 50%, and more preferably at least 95% of the $AlO_4$ tetrahedra of the naturally occurring or as-synthesized zeolite are present in the staring zeolite. Most advantageously the starting zeolite contains as many as possible of its original $AlO_4$ tetrahedra, i.e. has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of titanium for framework aluminum is concerned, but since the substitution mechanism may involve the in situ formation of salts of at least some of the zeolitic cations, it is advantageous that these salts be water soluble to a substantial degree to facilitate their removal from the molecular sieve product. It is found that ammonium cations form the most soluble salts in this regard and it is accordingly preferred that at least 50 percent, most preferably 85 or more percent, of the zeolite cations be ammonium or hydronium cations. Sodium and potassium, two of the most common cations present in zeolites, are found to form $Na_3AlF_6$ and $K_3AlF_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the molecular sieve product is desired since substantial amounts of fluoride can cause crystal collapse at temperatures as low as 500° C.

The titanium containing molecular sieve compositions have framework aluminum removed from the starting zeolite with substitution therefor by titanium. The instant process generally comprises contacting a crystalline zeolite having a pore diameter of at least about 3 Angstroms and having a molar $SiO_2/Al_2O_3$ ratio of at least 3, with an effective amount of a fluoro salt of titanium, preferably an amount of at least 0.001 moles of fluoro salt per 100 grams of zeolite starting material, said fluoro salt being in the form of a solution or slurry, preferably aqueous and/or alcohols, at an effective pH where the pH value is generally greater than one (1), more preferably greater than 3 and most preferably in the range of about 3 to about 7. The fluoro salt solution or slurry is brought into contact with the zeolite either incrementally or continuously at a slow rate whereby framework aluminum atoms of the zeolite are removed and replaced by titanium atoms from the fluoro salt. The fluoro salt is preferably provided as an aqueous solution or slurry but it is believed that solutions or slurries employing alcohols and other organic solvents may be employed.

The fluoro salt is in the form of a solution or slurry, preferably aqueous, and is brought into contact with the zeolite either incrementally or continuously at an effective rate such that a portion of the framework aluminum atoms are removed and replaced by titanium atoms at a rate which preferably retains at least 80 percent and more preferably at least 90 percent of the crystal structure of the starting zeolite.

The fluoro salt used as the aluminum extractant and also as the source of titanium which is inserted into the zeolite structure in place of the extracted aluminum, can be any of the fluoro salts having the general formula:

$$(A)_{2/b}{}^{Z}F_6; (A)_{2/b}{}^{Z}F_5; \text{ or } (A)_{2/b}{}^{Z}F_4$$

wherein "Z" is titanium and "A" is a metallic or nonmetallic cation, having the valence "b". Cations represented by "A" include alkylammonium, $NH_4^+$, $H^+$, $Mg^{++}$, $Li^+$, $Na^+$, $K^+$, $Ba^{++}$, $Cd^{++}$, $Cu^+$, $Cu^{++}$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$ and $Zn^{++}$. The ammonium cation form of the fluoro salt is generally preferred because of its solubility in water and also because the ammonium cations form water soluble by product salts upon reaction with the zeolite, namely $(NH_4)_3AlF_6$ and/or $(NH_4)_2AlF_5$.

There is no lower limit for the concentration of fluoro salt of titanium in the aqueous solution or slurry employed, provided of course the effective pH (the "effective pH" is a pH such that under effective process conditions a monomeric form of titanium is present in the reaction system) of the solution or slurry is high enough to avoid undue destructive acidic attack on the particular zeolite structure apart from the intended reaction with an effective amount of the fluoro salt, i.e. that amount which provides sufficient fluoride and amount of titanium for the process and desired amount of titanium in the final molecular sieve product. A slow rate of addition of the fluoro salt generally provides adequate time for the insertion of titanium as a framework substitute for extracted aluminum before excessive aluminum extraction occurs with consequent collapse of the crystal structure. Practical commercial considerations, however, may require that the reaction proceed as rapidly as possible, and accordingly the conditions of reaction temperature and reagent concentrations will necessarily be optimized with respect to each zeolite starting material and with respect to commercial operation. In general it is believed that the more highly siliceous the zeolite, the higher the permissible reaction temperature and the lower the pH conditions which may be employed in the instant process. In general the preferred effective reaction temperature is within the range between about 10° and about 99° C., preferably between about 20° C. and 95° C., but temperatures of 125° C. or higher and as low as 0° C. are believed employable in some instances with some zeolite starting materials and with fluoro salts in a form other than aqueous solutions or slurries. At pH values below about 3 crystal degradation of many zeolites is found to be unduly severe, whereas at pH values higher than 7, insertion of the titanium may be slow from a practical standpoint as a result of the solubility of titanium at these pHs and as a result of certain polymerization reactions. The maximum concentration of fluoro salt in the aqueous solution employed is, of course, interrelated to the temperature and pH factors and also with the time of contact between the zeolite and the solution and the relative proportions of zeolite and fluoro salt. Solutions having fluoro salt concentrations of between about $10^{-3}$ moles per liter of solution and up to saturation of the solution can be employed, but it is preferred that concentrations in the range of between about 0.5 and about 1.0 moles per liter of solution be used. In addition, as hereinbefore discussed, slurries of the fluoro salts of titanium may be employed. The aforementioned concentration values are with respect to true solutions, and are not intended to apply to the total fluoro salts in solution or in slurries of the salts in water. Even very slightly soluble fluoro salts can be slurried in water and used as a reagent—the undissolved solids being readily available to replace dissolved molecular species consumed in reaction with the zeolite. As stated hereinabove, the amount of dissolved fluoro salts employed with respect to the particular zeolite being treated will depend to some extent upon the physical and chemical properties of the individual zeolites and other effective process conditions. However, the minimum value for the amount of fluoro salt to be added is preferably at least equivalent to the minimum mole fraction of aluminum to be removed from the zeolite The preferred TASO prepared in the aforementioned manner is denominated as LZ-241. In example 12 of copending U.S. Pat. Ser. No. 604,179, LZ-241 was prepared as follows:

Five grams of an ammonium exchanged ZSM-5 zeolite containing 5.10 millimoles of aluminum, as $Al_2O_3$, were slurried in 100 ml distilled $H_2O$. Because of the limited solubility of $(NH_4)_2TiF_6$, the salt was added to the slurry as crystals. The weight of added $(NH_4)_2TiF_6$ was 1.00 gm and was an amount sufficient to replace 100% of the aluminum of the zeolite with titanium. The ZSM-5 zeolite and $(NH_4)_2TiF_6$ slurry were refluxed for 52 hours, filtered and washed with warm distilled water until qualitative tests of the wash water were negative for both aluminum and fluoride ions. The chemical analyses for the starting $NH_4$-ZSM-5 and the LZ-241 product were:

|  | Starting $NH_4$—ZSM-5 | LZ-241 Product |
|---|---|---|
| $Na_2O$, wt %: | 0.08 | N.D.* |
| $(NH_4)_2O$, wt %: | 1.95 | 1.18 |
| $TiO_2$, wt %: | — | 8.88 |
| $Al_2O_3$, wt %: | 5.09 | 2.60 |
| $SiO_2$, wt %: | 93.07 | 88.34 |
| $F_2$, wt %: | 0 | <0.1 |
| $Na^+/Al$: | 0.03 | 0.0 |
| $NH_4^+/Al$: | 0.75 | 0.89 |
| Cation Equivalent $M^+/Al$: | 0.78 | 0.89 |
| $SiO_2/Al_2O_3$: | 31.04 | 57.65 |
| $Si/(Al_2 + Ti_2)$: | — | 18.15 |

*none detected

The novel LZ-241 products have the characteristic crystal structure of zeolite ZSM-5 as indicated by an X ray diffraction pattern having at least the d spacings set forth in the following Table and having extraneous titanium atoms in the crystal lattice in the form of $TiO_4$ tetrahedra, preferably in an amount of at least 1.0 per 10,000Å$^3$:

| d(Å) | Relative Intensity |
|---|---|
| 11.1 ± 0.2 | very strong |
| 10.0 ± 0.2 | strong |
| 6.3 ± 0.1 | weak |
| 6.0 ± 0.1 | weak |
| 5.56 ± 0.1 | medium weak |
| 5.01 ± 0.1 | weak |
| 4.60 ± 0.1 | weak |
| 4.25 ± 0.1 | weak |
| 3.85 ± 0.1 | strong |

| $d^{(A)}$ | Relative Intensity |
|---|---|
| 3.71 ± 0.1 | medium |
| 3.04 ± 0.1 | medium |
| 2.99 ± 0.1 | medium weak |

TASO CATALYSTS

The TASOs employed in the instant invention are characterized in their calcined form by an adsorption of isobutane of at least 2 percent by weight, preferably at least 4 percent by weight, at a partial pressure of 500 torr and a temperature of 20° C. and are also characterized in their calcined form by adsorption of triethylamine of less than 5 percent by weight at a partial pressure of 2.6 torr and a temperature of 22° C. TASOs characterized by the above described adsorption of isobutane and triethylamine include, but are not limited to, TASO-45, TASO-48, TASO-49 and LZ-241. The preferred TASO for use herein is TASO-45.

The above characterization of the TASOs employed in the instant invention relates to an adsorption characterization that is carried out on a TASO which has been subjected to a post synthesis treatment, e.g., calcination or chemical treatment, to remove a substantial portion of the template "R" which is present as a result of synthesis. Although a particular TASO is characterized herein by reference to its adsorption of isobutane or triethylamine as relating to the adsorption characteristics of the TASO in its calcined form, the instant invention necessarily includes the use of a non-calcined or modified TASO which are characterized by such adsorption in the modified or calcined form, since upon use of such a non calcined TASO in the instant process at effective dewaxing conditions the TASO will be calcined or hydrothermally treated in situ so as to have the characteristic adsorption of isobutane and triethylamine. Thus, the TASO will be rendered in situ to a form characterized by the aforementioned adsorption characteristics. For example, an as synthesized TASO-45 may not be characterized by the aforementioned adsorption of isobutane due to the presence of template "R" which is present as a result of synthesis, although the calcined form of TASO-45 is characterized by the aforementioned adsorption of isobutane. Thus, reference to a TASO having a particular adsorption characteristic in its calcined form is not intended to exclude the use of the TASO in its as synthesized form which upon in-situ calcination, hydrothermal treatment and/or other treatment, e.g., ion exchange with suitable atoms, would have such adsorption characteristics.

In one embodiment the TASOs of the instant invention may be employed in conjunction with an effective amount of a cracking catalyst, including cracking catalysts and/or hydrocracking catalysts as heretofore employed in the prior art. Such catalysts generally contain a zeolitic aluminosilicate component having cracking activity and may be employed herein in conjunction with the TASO containing catalysts of the instant invention. The weight ratio of any zeolitic aluminosilicate to TASO is between about 1:20 to 20:1, desirably between 1:10 to 2:1 and preferably between about 1:2 to 1:1. The zeolitic aluminosilicate component of such catalysts may be any aluminosilicate heretofore employed as a component in cracking catalysts. The combination of a TASO(s) with a cracking catalyst provides the additional benefit of carrying out dewaxing and cracking in a concurrent operation. Representative of the zeolitic aluminosilicates disclosed heretofore as employable as component parts of cracking catalysts are Zeolite Y (U.S. Pat. No. 3,130,007), steam stabilized Zeolite Y (ultra stable Y), Zeolite X, Zeolite beta (U.S. Pat. No. 3,308,069), Silicalite (U.S. Pat. No. 4,061,724), Zeolite KZ 20 (U.S. Pat. No. 3,445,727), Zeolite ZSM 3 (U.S. Pat. No. 3,415,736), faujasite, LZ-10 (U.K. Pat. No. 2,014,970, June 9, 1982), ZSM-5, and mordenite. Cracking catalysts typically contain amounts of $Na_2O$ less than about one percent by weight and are generally preferred. Another zeolitic aluminosilicate employable herein is "LZ-210". LZ-210 is described in U.S. Pat. No. 4,503,023, issued Mar. 5, 1985, incorporated herein by reference thereto. ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

Figure 6:
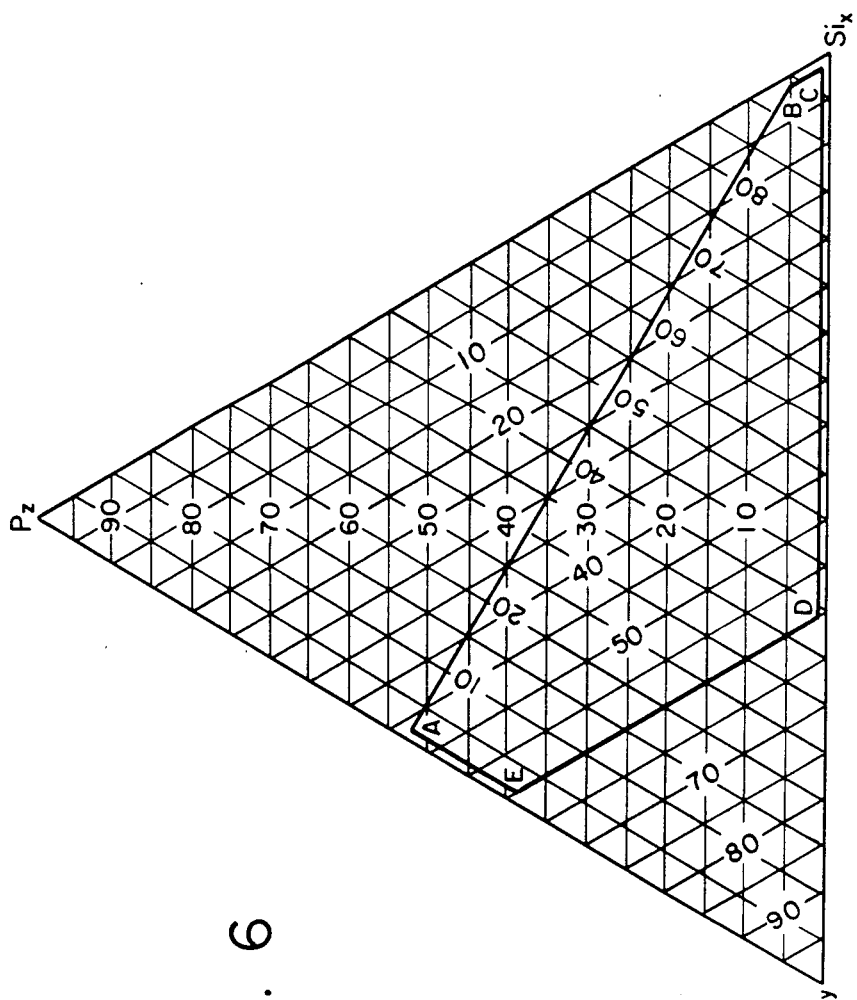
FIG. 6 is a ternary diagram wherein parameters relating to the reaction of mixtures employed in the preparation of the silicoaluminophosphates useful in the present invention are set forth as mole fractions, and is identical to FIG. 1 of U.S. Pat. No. 4,440,871.

In a further embodiment the dewaxing catalyst of the instant invention may be employed (with or without the aforementioned cracking catalyst(s)) with one or more of the silicoaluminophosphates of U.S. Pat. No. 4,440,871, incorporated herein by reference thereto. Members of this novel class of silicoaluminophosphate materials have a three-dimensional microporous crystal framework structure of $PO_2^+$, $AlO_2^-$ and $SiO_2$ tetrahedral units, and whose essential empirical chemical composition on an anhydrous basis is:

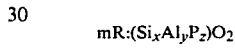

$$mR:(Si_xAl_yP_z)O_2$$

wherein "R" represents at least one organic templating agent present in the intracrystalline pore system: "m" represents the moles of "R" present per mole of $(Si_xAl_yP_z)O_2$ and has a value of from zero to 0.3, the maximum value in each case depending upon the molecular dimensions of the templating agent and the available void volume of the pore system of the particular silicoaluminophosphate species involved, "x", "y" and "z" represent the mole fractions of silicon, aluminum and phosphorus, respectively, present as tetrahedral oxides, said mole fractions being such that they are within the pentagonal compositional area defined by points A, B, C, D and E of the ternary diagram which is FIG. 6 herein, the said points A, B, C, D and E representing the following values for "x", "y" and "z":

| Point | Mole Fraction | | |
|---|---|---|---|
| | x | y | z |
| A | 0.01 | 0.47 | 0.52 |
| B | 0.94 | 0.01 | 0.05 |
| C | 0.98 | 0.01 | 0.01 |
| D | 0.39 | 0.60 | 0.01 |
| E | 0.01 | 0.60 | 0.39 |

It is believed that certain silicoaluminophosphates are preferred and include SAPO-11 and SAPO-31. The preparation and characterization of SAPO-11 and SAPO-31 are set forth in examples 15 to 21 and 51 to 53, respectively, of U.S. Pat. No. 4,440,871, incorporated here by reference thereto.

DEWAXING CATALYSTS AND DEWAXING PROCESSES

The catalysts of the instant invention comprise at least one TASO molecular sieve, as above characterized, and when employed in a hydrodewaxing process may also contain a hydrogenation catalyst. Further, one or more cracking catalyst components, e.g., catalytic cracking or hydrocracking catalysts, may be employed, wherein such contain one or more zeolitic aluminosilicate components. The relative amount of the TASO component or cracking catalyst component, if any, will depend at least in part, on the selected hydrocarbon feedstock to undergo dewaxing and on the desired pour point of the product, but in all instances an effective amount of a TASO(s) is employed in the dewaxing catalyst. The instant catalysts may contain an effective amount of at least one TASO up to 100 percent by weight of the total catalyst weight, less any hydrogenation component which may be present in an effective amount. Typically the catalyst contains between about 5 and about 80 weight percent of at least one TASO. The TASO and the zeolitic aluminosilicate, if any, may be ion exchanged with a selected cation(s) and/or thermally treated either before or after mixture with each other or after such have been added separately or concurrently to one or more inorganic oxide matrix components. When the TASO molecular sieves are ion exchanged such are preferably exchanged with a hydrogen forming cation species, e.g., $NH_4^+$, $H^+$, quaternary ammonium cations, etc. The TASO preferably has at least part of its cations as hydrogen forming cation species.

Hydrodewaxing catalysts contain a hydrogenation component. The hydrogenation component may be selected from the group of hydrogenation catalysts consisting of one or more metals of Group VI B and Group VIII, including the salts, complexes and solutions containing such metals. The preferred hydrogenation catalyst is at least one of the group of metals, salts and complexes selected from the group consisting of at least one of platinum, palladium, rhodium, iridium and mixtures thereof or at least one from the group consisting of nickel, molybdenum, cobalt, tungsten, titanium, chromium and mixtures thereof. As recognized in the art, the noble and base metals will not generally be employed in the same catalyst system. Reference to the catalytically active metal or metals is intended to include, but not be limited to, such metal or metals in the elemental state or in some form such as an oxide, sulfide, halide, carboxylate and the like.

The hydrogenation component is present in an effective amount to provide an effective hydrodewaxing catalyst. When the hydrogenation catalysts is a noble metal it is generally present in an amount between about 0.05% and about 1.5% by weight based on the total weight of the dewaxing catalyst including the weight of any binder or matrix material which may be present, as hereinafter discussed, although effective amounts outside this range may be employed. Although effective amounts in excess of 1.5 percent by weight may be employed, the preferred effective amount of the noble metal hydrogenation component is between about 0.3% and about 1.2% by weight. When the hydrogenation catalyst is a base metal(s) the effective amount will generally be between about 0.1% and about 30% percent by weight or more of the base metal, expressed as the oxide(s), based on the total weight of the dewaxing catalyst although effective amounts outside this range may be employed.

The final form of the hydrogenation component is not narrowly limited herein but may be a metal oxide, metal sulfide or other catalytically active form of the hydrogenation component. Since sulfur is typically present in the hydrocarbon feedstock being treated, the actual form of some of the hydrogenation component(s) may well be at least in part a sulfide due to in situ reactions. When a noble metal is employed as the hydrogenation component the catalyst is generally activated in air and then reduced in a hydrogen atmosphere. When a base metal(s) is employed the base metal is typically treated with a sulfur compound prior to use in a dewaxing process.

The hydrogenation components can be incorporated into the overall catalyst composition by any one of numerous procedures and can be added either to the TASO component or to a metal oxide support or matrix or to a combination thereof by ion exchange, impregnation, occlusion and the like. In the alternative, multiple hydrogenation components (two or more) may be added as powders in the formulation of the catalyst. They may be added by co-mulling, impregnation, or ion exchange whereby one or more may be added to TASO by impregnation, co-mulling or co-precipitation. For example, noble or base metal compounds, such as the sulfides, oxides or water soluble salts, can be added by co-mulling, impregnation or precipitation before the composite is finally calcined. Further, these components can be added to a finished catalyst particle by impregnation with an aqueous, alcoholic, hydrocarbon or other nonaqueous solution of soluble compounds or precursors.

Although the hydrogenation components can be combined with the TASO, in the oxide form, the hydrogenation component(s) is usually added as a metal salt which can be thermally converted to the corresponding oxide in an oxidizing atmosphere or reduced to the metal with hydrogen or other reducing agent. The composition can be sulfided by reaction with a sulfur donor such as carbon disulfide, hydrogen sulfide, hydrocarbon thiols, elemental sulfur, and the like, described above. The above oxidizing or sulfiding processes are generally carried out on catalyst compositions which have been partially dried (as desired), tableted, pelleted, extruded (with binder or matrix), or formed by other means and then calcined, e.g., at a temperature above 600° F., usually above 800° F.

The dewaxing catalysts of the instant invention are generally employed with a binder material or, as commonly referred to, with an inorganic oxide matrix which can be an inert or catalytically active inorganic oxide. For example inorganic matrices such as silica, alumina, silica-alumina, silica-zirconia, silica-magnesia, alumina-boria, alumina-titania and the like and mixtures thereof may be employed. An inorganic oxide may be employed in an amount from zero to about 99 percent by weight, desirably between about 1% and about 95% by weight, preferably between about 10% and about 80% by weight. based on the total weight of the dewaxing catalyst.

The term "crude oil feedstock" is used herein to denominate any crude oil feedstock or portion thereof and includes full range crude oils from primary, secondary or tertiary recovery from conventional or offshore oil fields shale oils, lube oils and the myriad of feedstocks derived therefrom. Crude oil feedstocks include syncrudes such as those that can be derived from coal, Fisher Tropsch reaction products, shale oil, tar sands and bitumens. The crude oil feedstock may be virgin (straight run) or generated synthetically by blending. Such crude oil feedstocks are traditionally desalted prior to use, since sodium chloride is known to be a poison in many dewaxing operations. Further, the term "crude oil feedstocks" is intended to include component parts of crude oils which have heretofore been generally employed as feedstocks or potential feedstocks in dewaxing processes and include distillate gas oils, heavy vacuum gas oils, VGO, reformates, kerosene, diesel fuel, atmospheric and vacuum resids, syncrudes, lube oils, shale oil fractions boiling above the traditional end of the gasoline boiling range which generally includes compounds containing greater than about eleven carbon atoms and combinations thereof.

The hydrocarbon feedstock for dewaxing typically boils above 350° F., preferably between about 400° F. and 1200° F. and more preferably between about 400° F. and about 900° F. Shale oil and lube oil feedstocks are generally employable herein. The hydrocarbon feedstock may be pre-treated in a hydrotreater to reduce, i.e., remove, compounds which contain sulfur and/or nitrogen. The hydrocarbon feedstock may have a significant sulfur content, ranging from 0.1 to 3 weight percent, and nitrogen content in an amount up to 2 weight percent. Temperature, space velocity, and other process variables may be adjusted to compensate for the effects of nitrogen on the dewaxing catalyst activity. The feedstock is contacted in the dewaxing reaction zone with the dewaxing catalyst and, optionally, in the presence of hydrogen-containing gas and/or a hydrogen generating compound. In hydrodewaxing, hydrogen is consumed in the hydrodewaxing process and an excess of hydrogen is typically maintained in the reaction zone. Advantageously, a hydrogen-to-oil (feed) ratio of at least 1,000 standard cubic feet of hydrogen per barrel of feed (SCFB) is employed, and the hydrogen-to-oil ratio may range up to 20,000 SCFB. Preferably, about 4,000 to 12,000 SCFB is employed. Typical dewaxing and hydrodewaxing conditions are disclosed in U.S. Pat. No. Re. 28,398, U.S. Pat. No. 3,852,189 and U.S. Pat. No. 4,282,085, said patents incorporated herein by reference.

The instant process is carried out under effective catalytic dewaxing or hydrodewaxing conditions. Catalytic dewaxing is generally carried out at a LHSV (liquid hourly space velocity) between about 0.2 and about 50, a temperature between about 500° F. and about 1200° F. and a pressure between about subatmospheric and about 500 atmospheres. Hydrodewaxing is generally carried out at a LHSV between about 0.1 and about 15, a temperature between about 400° F. and about 900° F., at a pressure between about 10 psig and about 2500 psig and using molar ratios of hydrogen to hydrocarbon feedstock between about 1 and about 100.

The following examples were carried out to demonstrate the use of the dewaxing catalysts and dewaxing processes of the invention and are not intended to be limiting thereof.

EXAMPLE 1

Three catalysts were prepared for evaluation as dewaxing catalysts and were denominated Catalysts A, B and C. Catalysts A and B are according to the instant invention and Catalyst C is a comparative catalyst. All weights are given as anhydrous weights unless otherwise designated. The catalysts were prepared as follows:

(a) A TASO-45 molecular sieve (for incorporation in Catalyst (A) was prepared using the following molar oxide ratios of reactants. The following amounts are expressed as the moles of oxides of each reactant derived from the use of the reactant. Thirty five (35) moles of LUDOX-LS (Trademark of DuPont for an aqueous solution of 40 wt. percent $SiO_2$ and 0.1 wt. percent $Na_2O$) and 1186 moles of water were blended to form a homogeneous mixture. A second mixture was formed using 593 moles of water and 10 moles of sodium hydroxide and then blended to form a homogeneous mixture. Sodium aluminate (1 mole) was dissolved in this second mixture. The two mixtures were then blended to form a homogeneous mixture. The titanium source was titanium bis(2,4 pentanedionate 0,0'bis(2 propanolato) and was blended into this mixture to give a $SiO_2$ to $TiO_2$ molar ratio of 7:1 after which 1.0 mole of organic templating agent (tetrapropylammonium hydroxide) was added to this mixture and blended until a homogeneous mixture was observed. The mixture was heated at 200° C. for 10 days and a TASO-45 product obtained, characterized by the X-ray pattern of Table III. This TASO product was denominated TASO-45(A).

(b) A second TASO-45 molecular sieve (for incorporation in Catalyst (B) was prepared using the following molar oxide ratios of reactants. The following amounts are expressed as the moles of oxides of each reactant derived from the use of the reactant. Thirty five moles of LUDOX LS and about 858 moles of water were mixed and this mixture was blended to form a homogeneous mixture. The titanium source was titanium acetonylacetonate and 5 moles was added to this mixture and blended to form a homogeneous mixture. Sodium aluminate (1.0 mole) was dissolved in about 429 moles water and blended with the previous mixture. Organic template (3.6 moles of tetrapropylammonium hydroxide in 429 moles of water) was added to this mixture and blended until a homogeneous mixture was observed. The mixture was heated at 200° C. for 10 days and a TASO-45 product obtained. The product was characterized by the X-ray pattern of Table III. This TASO product was denominated TASO-45(B).

(c) Catalyst A is a catalyst according to the instant invention and was prepared using TASO-45(A) as prepared in part (a). Catalyst A was prepared by blending 30 grams of TASO-45(A), 50 grams of a pseudoboehmite alumina and 20 grams of a peptized boehmite alumina in a Hobart mixer for 30 minutes. The boehmite alumina was peptized with 3 cc of concentrated nitric acid in 50 cc of water before mixture with the TASO-45. The mixture was extruded as 1/16 inch extrudates, air dried at 100° C. for about 16 hours and calcined in air at 500° C. for 3 hours. The calcination at 500° C. was carried out in a stepwise manner by heating the catalyst from room temperature to 220° C. over a one hour period, heating the catalyst at 220° C. for 1.5 hours, heating the catalyst from 220° C. to 500° C. over a one hour period and then heating the catalyst at 500° C. for 2 hours. The calcined extrudates were porefilled by adding 74 grams of the extrudates to a solution prepared by dissolving 15.5 grams of $Ni(NO_3)_2.6H_2O$ and 26.6 grams of ammonium metatungstate in enough water to give a total volume of 35 cc. After the extrudates absorbed the solution the extrudates were dried in air at 100° C. for 16 hours and then calcined in air at 500° C. for 3 hours. Catalyst A, expressed as the weight percent oxide on an anhydrous basis, was prepared to be: 22.4% TASO-45; 52.3% $Al_2O_3$; 3.5% NiO and 21.8% $WO_3$. Chemical analysis of Catalyst A for NiO and $WO_3$ gave 3.9 wt. % NiO and 22.64 wt. % $WO_3$.

(d) Catalyst B was prepared according to this invention using the TASO-45(B), above described in part (b), and a catalyst preparation similar to that employed for Catalyst A in part (c) above, except a silica (LUDOX AS-40: an ammonium stabilized silica gel available from DuPont) was employed in place of alumina by adding 25 cc of 10 wt. % ammonium acetate to 81.6 grams of LUDOX AS-40 by gentle heating of the mixture at about 40° to 60° C. The gelled mixture was cooled to room temperature and 14 grams of TASO-45(B) was added to the gel. Water was added to this mixture to provide a consistency suitable for extrusion. The mixture was extruded into 1/16 inch pellets which were dried at 100° C. and calcined at 500° C., by the procedure above described for Catalyst A. The calcined extrudates were porefilled by the procedure described for Catalyst A.

(e) Catalyst C is a comparative catalyst and was prepared according to the procedure employed for Catalyst A, except TASO-45 was replaced by silicalite. Silicalite is disclosed in U.S. Pat. No. 4,061,724.

EXAMPLE 2

The three catalysts (Catalyst A, B and C) prepared in example 1 were evaluated for dewaxing and their use in reducing the pour point of hydrocarbon feedstocks by contacting a selected feedstock with hydrogen at a total pressure of 2000 psig at a Liquid Hourly Space Velocity (LHSV) of 1.0 cc/cc hr.$^{-1}$, a WHSV of 1.31 gm/gm hr$^{-1}$ (0.86 gm/gm hr$^{-1}$ for Catalyst C), and a hydrogen flow rate of 10,000 SCFB (Standard Cubic Feet per Barrel) at temperatures between about 700° F. and 800° F. Fifty cubic centimeters of Catalyst were evaluated in each catalyst evaluation. The feedstock employed in the instant evaluation was a vacuum gas oil having an IBP (Initial Boiling Point) of 560° F. and a FBP (Final Boiling Point) of 1148° F. (both determined by ASTM test method D-2887), API Gravity of 22.3 and having a pour point of greater than 95° F. The feedstock was characterized by the following physical and chemical characteristics:

|  | Weight Percent |
| --- | --- |
| Paraffins | 24.1 |
| Mono-naphthenes | 9.5 |
| Poly-naphthenes | 8.7 |
| Mono-aromatics | 13.3 |
| Di-aromatics | 9.3 |
| Tri-aromatics | 4.3 |
| Tetra-aromatics | 2.7 |
| Penta-aromatics | 0.7 |
| Sulfur | 25,600 ppm |

Figure 2:
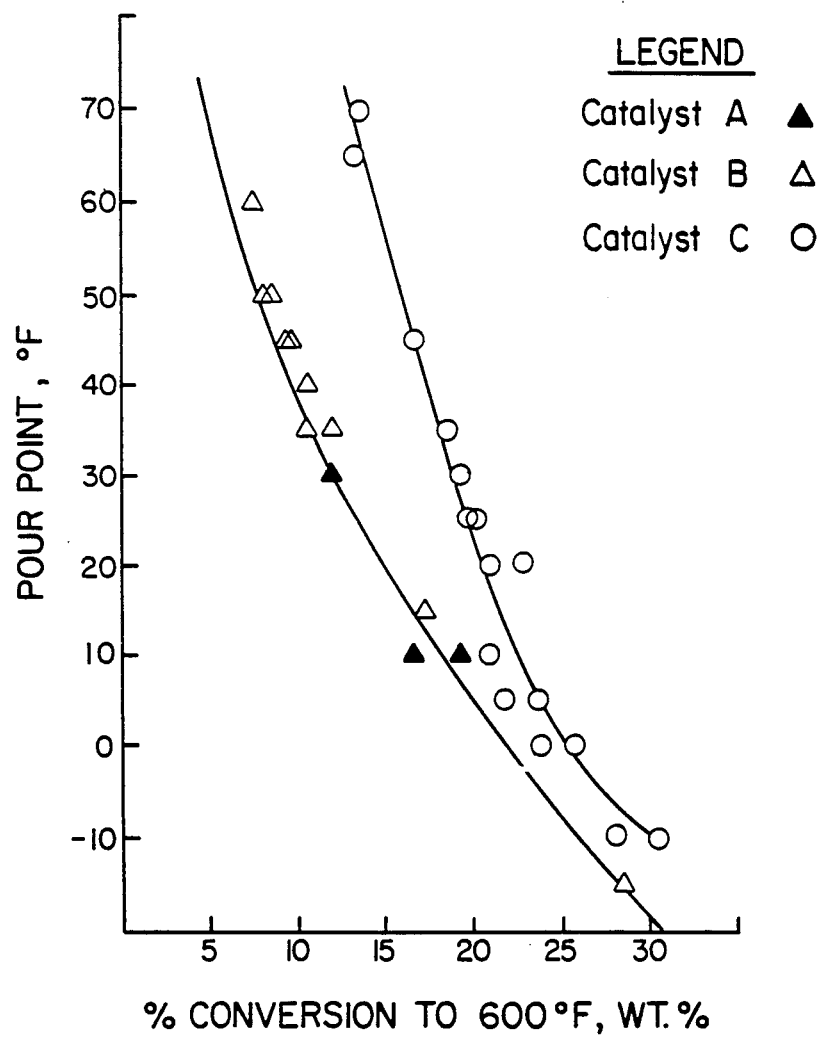
FIG. 2 is a plot of the pour point (°F.) as a function of conversion for Catalyst B, Catalyst A and Comparative Catalyst C.

The reactor effluents were collected and the fraction of the feed ("Conversion" on a weight basis) converted to products boiling below 600° F. determined by simulated distillation (ASTM test method D-2887). The conversion is reported as the weight percent of feedstock converted to products boiling below 600° F. The pour points were determined by ASTM test method D-97-66 on the reactor effluents after maintaining the effluent at about 130° F. during its collection. The results in Tables A and B, below demonstrate that at comparable temperatures that Catalysts A was more active and provided a greater reduction in the pour point of the products than that obtained by use of Catalyst C. The data in Tables A and B are graphically depicted in FIG. 1 for Catalyst A and Catalyst C and show the decrease in pour point as a function of temperature obtained using TASO-45 (Catalyst A) as compared to Catalyst C. FIG. 1 shows that Catalyst A is substantially more active in that use of Catalyst A results in lower pour point products at comparable process temperatures. FIG. 2 shows the decrease in pour point as a function of conversion. FIG. 2 graphically depicts the decrease in the pour point of the products obtained by Catalysts A and B as compared to Catalyst C as a function of conversion. Catalysts A and B are substantially more selective than Catalyst C, as indicated by the lower pour point products, at comparable conversions. The benefits to be derived by a refiner employing the catalysts of the instant invention include higher yields of commercially desirable products with lower energy usage.

TABLE A (Catalysts A & B)

| Catalyst | Temperature (°F.) | Conversion | Pour Point | Hours on Stream |
| --- | --- | --- | --- | --- |
| A | 713 | 16.67 | 10 | 42.4 |
| A | 712 | 19.21 | 10 | 114.1[1] |
| A | 681 | 11.90 | 30 | 138.1 |
| B | 768 | 17.4 | 15 | 68.2[2] |
| B | 796[3] | 28.35 | −15 | 90.8 |
| B | 749 | 11.85 | 35 | 115.3 |
| B | 721 | 7.31 | 60 | 139.3 |
| B | 731 | 8.49 | 50 | 161.3 |
| B | 730 | 8.20 | 50 | 185.3 |
| B | 740 | 9.43 | 45 | 235.5 |
| B | 740 | 9.28 | 45 | 259.2 |
| B | 750 | 10.63 | 35 | 282.5 |
| B | 751 | 10.48 | 40 | 306.7 |

[1]Run halted for two hours after 67 hours and then continued
[2]At 35 to 45 hours on stream the average bed temperature was 880° F.
[3]0.11 weight percent residual nitrogen observed in the product.

TABLE B (Comparative Catalyst C)[1]

| Catalyst | Temperature (°F.) | Conversion | Pour Point | Hours on Stream |
| --- | --- | --- | --- | --- |
| C | 711 | 18.48 | 35 | 42.0 |
| C | 709 | 16.73 | 45 | 66.1 |
| C | 725 | 20.22 | 25 | 90.0 |
| C | 700 | 13.14 | 70 | 114.0 |
| C | 725 | 19.73 | 25 | 138.1 |
| C | 726 | 21.02 | 10 | 162.3 |
| C | 725 | 21.75 | 5 | 185.9 |
| C | 726 | 20.80 | 20 | 210.5 |
| C | 725 | 19.15 | 30 | 234.7 |
| C | 745 | 28.16 | −10 | 257.6 |
| C | 745 | 30.57 | −10 | 281.9 |
| C | 700 | 13.25 | 65 | 305.8 |
| C | 735 | 23.77 | 0 | 330.3 |
| C | 735 | 23.66 | 5 | 354.1 |
| C | 735 | 25.57 | 0 | 378.2 |
| C | 736 | 22.96 | 20 | 402.3 |

[1]Comparative Catalyst C containing silicalite.

What is claimed is:

1. The process for dewaxing a hydrocarbon feedstock comprising contacting the hydrocarbon feedstock with a dewaxing catalyst comprising at least one titanoaluminosilicate (TASO) characterized in its calcined form by an adsorption of isobutane of at least 2 percent by weight at a pressure of 500 torr and a temperature of 20° C. and further characterized in its calcined form by an adsorption of triethylamine of less than 5 percent by weight at a pressure of 2.6 torr and a temperature of 22° C., the amount of the TASO in the catalyst and the condition of the contacting being effective to cause dewaxing of the hydrocarbon feedstock.

2. The process for hydrodewaxing a hydrocarbon feedstock to reduce its pour point comprising contacting the hydrocarbon feedstock with a catalyst in the presence of hydrogen wherein the catalyst comprises at least one hydrogenation component and at least one titanoaluminosilicate (TASO) characterized in its calcined form by an adsorption of isobutane of at least 2 percent by weight at a pressure of 500 torr and a temperature of 20° C. and further characterized in its calcined form by an adsorption of triethylamine of less than 5 percent by weight at a pressure of 2.6 torr and a temperature of 22° C., the amount of the TASO in the catalyst and the conditions of the contacting being effective to cause hydrodewaxing.

3. The process of claim 1 or claim 2 wherein said adsorption of isobutane is at least 4 percent by weight at a pressure of 500 torr and a temperature of 20° C.

4. The process of claim 3 wherein said adsorption of triethylamine is less than 3 percent by weight at a pressure of 2.6 torr and a temperature of 22° C.

5. The process of claim 1 or claim 2 wherein said catalyst contains at least one cracking catalyst having cracking activity wherein said cracking catalyst comprises at least one zeolitic aluminosilicate present in a weight ratio between about 1:20 and about 20:1 of said zeolitic aluminosilicate to said TASO molecular sieve.

6. The process of claim 5 wherein the weight ratio of zeolitic aluminosilicate to said TASO is between about 1:10 and about 2:1.

7. The process of claim 5 wherein the cracking catalyst is a hydrocracking catalyst.

8. The process of claim 1 or 2 wherein said catalyst comprises an inorganic oxide matrix component present in an amount from 0 to about 99 percent by weight, based on the total weight of said catalyst.

9. The process of claim 8 wherein said inorganic oxide matrix component is present in an amount between about 1 and about 95 percent by weight.

10. The process of claim 1 or claim 2 wherein said TASO is selected from the group consisting of TASO-45, TASO-48, TASO-49, LZ-241 and mixtures thereof.

11. The process of claim 10 wherein said TASO is TASO-45.

12. The process of claim 1 wherein the process is carried out by contacting a hydrocarbon feedstock boiling between 400° F. and about 1200° F. with said catalyst at a temperature between about 500° F. and about 1200° F., at a pressure between about subatmospheric to about 500 atmospheres and a LHSV between about 0.2 an about 50.

13. The process of claim 2 wherein the process is carried out by contacting a hydrocarbon feedstock boiling between about 400° F. and about 1200° F., in the presence of hydrogen with said catalyst at a temperature between about 400° F. and about 900° F., at a pressure between about 10 psig. and about 2500 psig., and at a molar ratio of hydrogen to hydrocarbon feedstock between about 1 and about 100.

14. The process of claim 5 wherein said zeolite aluminosilicate is selected from the group consisting of zeolite Y, LZ-210 and mixtures thereof and said TASO is TASO-45.

15. The process of claim 9 wherein said inorganic oxide matrix component is selected from the group consisting of clays, silicas, aluminas, silica-aluminas, silica-zirconias, silica-magnesia, alumina-borias, alumina-titanias and mixtures thereof.

16. The process of claim 12 or claim 13 wherein said TASO is TASO-45.

17. The process of claim 1 or claim 2 wherein said hydrocarbon feedstock is selected from the group consisting of lube oils, distillate gas oils, naphtha, reformates, kerosene, diesel fuel, heavy vacuum gas oils, Fischer Tropsch reaction products, VGO, atmospheric resids, vacuum resids, syncrudes, shale oils and mixtures thereof.

18. The process of claim 5 wherein said zeolitic aluminosilicate is selected from the group consisting of zeolite Y, ultra-stable zeolites, zeolite X, zeolite beta, zeolite KZ-20, faujasite, LZ-210, LZ-10, ZSM-5 zeolites and mixtures thereof.

19. The process according to claim 2 wherein the hydrogenation catalyst comprises at least one metal selected from the group consisting of the following chemical elements Pt, Pd, Rh, Ru, Ni, W, Mo, Co, Ti, Cr and mixtures thereof.

20. The process of claim 19 wherein said metal is selected from the group consisting of Pt, Pd, Rh, Ru and mixtures thereof and is present in an amount between about 0.05 weight percent and about 1.5 weight percent.

21. The process of claim 20 wherein said amount is between about 0.3 and about 1.2 weight percent.

22. The process of claim 19 wherein the metal is selected from the group consisting of Ni, W, Mo, Co, Ti, Cr and mixtures thereof and is present in an effective amount between about 0.1 and about 30 percent by weight.

23. The process of claim 1 wherein said catalyst further comprises at least one silicoaluminophosphate (SAPO) having a three-dimensional microporous crystal framework structure of $PO_2^+$, $AlO_2^-$ and $SiO_2$ tetrahedral units, and whose essential empirical chemical composition on an anhydrous basis is:

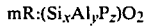

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to 0.3, "x," "y" and "z" represent the mole fractions of silicon, aluminum, and phosphorus, respectively, present as tetrahedral oxides, said mole fractions being such that they are within the pentagonal compositional area defined by A B C D and E of the ternary diagram which is FIG. 6 of the drawings.

24. The process of claim 23 wherein said SAPO is SAPO-11 or SAPO-31.

25. The process of claim 23 wherein said catalyst further comprises at least one cracking catalyst having cracking activity.

26. The process for dewaxing a hydrocarbon feedstock comprising contacting the hydrocarbon feedstock with a dewaxing catalyst comprising at least one titanoaluminosilicate (TASO) selected from the group consisting of TASO-45, TASO-48, TASO-49, LZ-241 and mixtures thereof and characterized in its calcined form by an adsorption of isobutane of at least 2 percent by weight at a pressure of 500 torr and a temperature of 20° C. and further characterized in its calcined form by an adsorption of triethylamine of less than 5 percent by weight at a pressure of 2.6 torr and a temperature of 22° C., the amount of the TASO in the catalyst and the conditions of the contacting being effective to cause dewaxing of the hydrocarbon feedstock.

27. The process for hydrodewaxing a hydrocarbon feedstock to reduce its pour point comprising contacting the hydrocarbon feedstock with a catalyst in the presence of hydrogen wherein the catalyst comprises at least one hydrogenation component and at least one titanoaluminosilicate (TASO) selected from the group consisting of TASO-45, TASO-48, TASO-49, LZ-241 and mixtures thereof and characterized in its calcined form by an adsorption of isobutane of at least 2 percent by weight at a pressure of 500 torr and a temperature of 20° C. and further characterized in its calcined form by an adsorption of triethylamine of less than 5 percent by weight at a pressure of 2.6 torr and a temperature of 22° C., the amount of the TASO in the catalyst and the conditions of the contacting being effective to cause dewaxing of the hydrodewaxing feedstock.

* * * * *